United States Patent [19]

Fuller et al.

[11] Patent Number: 5,146,843
[45] Date of Patent: Sep. 15, 1992

[54] APPARATUS FOR THAWING FROZEN FOOD

[76] Inventors: Robert Fuller, 1211 Evergreen Ave., South, Clearwater, Fla. 33516; David Pasek, 3338 Hunt Club Dr., Clearwater, Fla. 33519

[21] Appl. No.: 730,579

[22] Filed: Jul. 15, 1991
(Under 37 CFR 1.47)

Related U.S. Application Data

[63] Continuation of Ser. No. 193,194, May 9, 1988, abandoned, which is a continuation of Ser. No. 771,727, Sep. 3, 1985, abandoned, which is a continuation-in-part of Ser. No. 646,087, Aug. 31, 1984, abandoned, and a continuation-in-part of Ser. No. 669,791, Nov. 9, 1984, abandoned.

[51] Int. Cl.⁵ ............................ A23L 3/00; A23B 7/00
[52] U.S. Cl. .................................. 99/483; 68/12.05; 99/403; 99/487; 99/516; 99/536; 366/137; 366/153
[58] Field of Search ................ 99/483, 516, 517, 534, 99/536, 403, 408, 409, 467, 477, 487, 348; 426/524; 366/101, 107, 136, 137, 132, 262, 263, 165, 176, 153, 152, 601; 68/12.05

[56] References Cited

U.S. PATENT DOCUMENTS

| | | | |
|---|---|---|---|
| 1,737,609 | 12/1929 | Nielsen | 366/153 |
| 2,155,868 | 4/1939 | Pauly et al. | 68/12.05 |
| 2,302,923 | 11/1942 | Zimarik | 68/12.05 |
| 2,365,293 | 12/1944 | Robinson | 366/136 |
| 2,401,476 | 6/1946 | Geldhof et al. | 68/12.05 |
| 3,477,258 | 11/1969 | Walker et al. | 68/12.05 |
| 4,165,186 | 8/1979 | Tortorich et al. | 366/262 |
| 4,332,483 | 6/1982 | Hope et al. | 366/152 |
| 4,385,703 | 5/1983 | Murphy | 99/408 X |
| 4,487,691 | 12/1984 | Panora | 99/408 X |
| 4,571,092 | 2/1986 | Switall | 366/153 |
| 4,580,421 | 4/1986 | Babuin et al. | 68/12.13 |
| 4,623,544 | 11/1986 | Highnote | 99/408 X |
| 4,812,045 | 3/1989 | Rivers | 366/137 |

FOREIGN PATENT DOCUMENTS

| | | | |
|---|---|---|---|
| 0008794 | 1/1987 | Japan | 68/12.05 |
| 0146579 | 6/1989 | Japan | 68/12.05 |

*Primary Examiner*—Timothy F. Simone
*Attorney, Agent, or Firm*—Foley & Lardner

[57] ABSTRACT

Frozen food is thawed automatically by disposing the food within a container having a trough disposed adjacent to a top of the container, the trough being connected to a drain, filling the container with water to a predetermined level, providing a controlled metered secondary flow of fresh water into the container so as to cause the water level to rise and flow into the trough, forcibly recirculating, using a pump, water in the container so as to produce sufficient water circulation to maintain a substantially even water temperature distribution therein and so as to produce sufficient agitation of the water to break loose small food particles from the frozen food immersed in the water such that the food particles and food-related oils and debris float to the surface of the water and are carried into the trough.

12 Claims, 3 Drawing Sheets

APPARATUS FOR THAWING FROZEN FOOD

This application is a continuation of application Ser. No. 07/193,194, filed May 9, 1988, now abandoned, which is a continuation of Ser. No. 771,727, filed Sep. 3, 1985, now abandoned, which is a continuation-in-part of prior application Ser. No. 646,087, filed Aug. 31, 1984, now abandoned and application Ser. No. 669,791, filed Nov. 9, 1984, now abandoned the disclosures of which are incorporated by reference herein.

BACKGROUND OF THE INVENTION

This application relates to food processing techniques, and more particularly, to techniques for thawing frozen foods.

Food processing facilities, such as restaurants and the like, and particularly those facilities involved in processing seafood, have a need for quickly thawing frozen food products. Typically, thawing is accomplished by placing the frozen food product to be thawed in an open sink having a stand pipe set into the drain, and allowing cold tap water to flow into the sink at a rate of the order of five to eight gallons per minute for a sufficient period of time to thaw the frozen food product. The excess water is allowed to flow over the top of the stand pipe and to be drained away. This process has a number of disadvantages. It does not afford an even water temperature distribution throughout the sink, and the temperature differenitial between the top and the bottom of the sink may be as much as thirty degrees, which results in uneven thawing. Depending upon the quantity of frozen food to be thawed, this process may require three to four hours for complete thawing of all of the food product. At a flow rate of five to eight gallons per minute, this process wastes a tremendous amount of water. Moreover, the rather long time that the food product must remain immersed in water causes it to become waterlogged and some of its taste to be washed out.

There is a need for improved apparatus and methods for thawing frozen food products, particularly on a large scale, which avoid these and other disadvantages of known apparatus and methods, and it is to this end that the present invention is directed.

SUMMARY OF THE INVENTION

The invention affords significantly improved apparatus and methods for thawing frozen food products which are rather simple and inexpensive, and which may be readily implemented in food processing facilities. The invention enables rather large quantities of frozen food to be quickly thawed in substantially less time than required by known apparatus and methods, provides a significantly better quality of thawed food product, and avoids the tremendous waste of water which characterizes known apparatus and methods for thawing frozen food.

Briefly stated, apparatus in accordance with the invention for thawing frozen food comprises a container for water having a trough disposed therein adjacent to the top of the container, the trough having a drain for discarding water flowing into the trough. First means are provided for filling the container with water to a first predetermined level, and second means, operative upon filling of the container, are included for supplying a controlled fresh water flow into the container at a predetermined flow rate and for a predetermined period of time so as to cause the water level to rise and flow into the trough. Third means are included which are operative simultaneously with the second means for removing water from the container at another predetermined rate and for forcibly recirculating the removed water back into the container so as to produce sufficient water circulation within the container to maintain a substantially even water temperature distribution therein and so as to produce sufficient agitation of the water to break loose small food particles from the frozen food immersed within the water in the container.

In another aspect, the invention affords a method for thawing frozen food which comprises immersing the frozen food in water in a container which has a trough disposed therein at a predetermined water level, the trough having a drain for draining water flowing thereinto. A controlled flow of fresh water is supplied to the container for a predetermined period of time so as to produce an overflow of water at a predetermined rate into the trough. Simultaneously with supplying the fresh water, water is removed from the container and forcibly recirculated back into the container so as to produce sufficient circulation of the water within the container to maintain a substantially even water temperature distribution therein and so as to produce sufficient agitation to break loose small food particles from the frozen food.

Preferably, the apparatus and method are automatically controlled, as by a timer, for example, so that upon initiation the entire thawing process proceeds independently and without the necessity for intervention of an operator. After placing the frozen food in the container and setting a desired thawing time, the container preferably fills itself with water, commences the supply of fresh water at a preset controlled rate and the recirculation of the water, and alerts an operator, as by an alarm, at the expiration of the preset time. Other more specific aspects and features of the invention will become apparent from the description which follows.

DESCRIPTION OF THE PREFERRED EMBODIMENT

Figure 1:
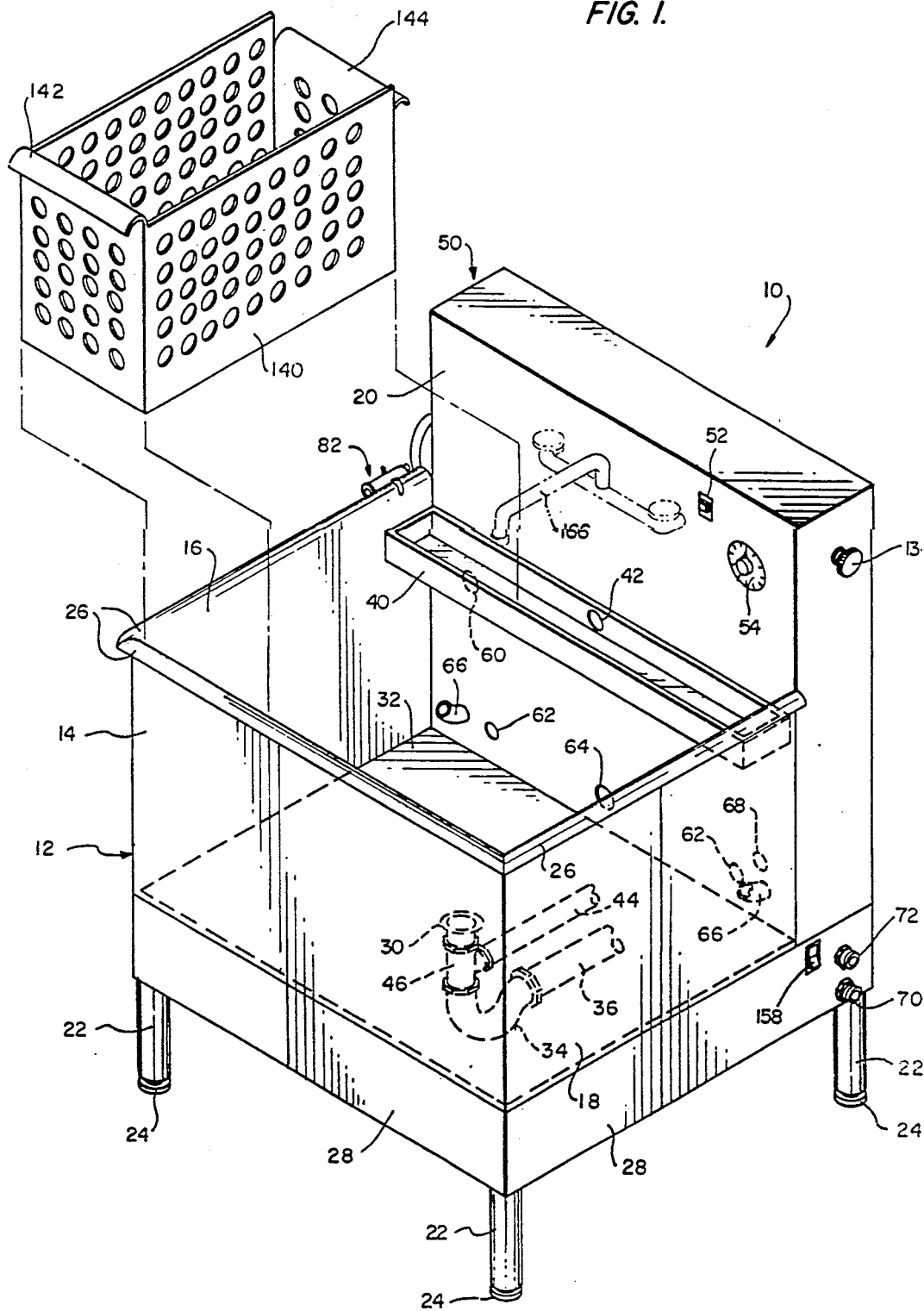
FIG. 1 is a perspective front view illustrating an apparatus in accordance with the invention for thawing frozen food.

FIG. 1 illustrates a preferred form of an apparatus 10 in accordance with the invention for thawing frozen food products. As shown, the apparatus may comprise a substantially rectangular open top container 12 such as a large sink or basin. Container 12, which may comprise a front wall 14, side walls 16 and 18, and a rear wall 20 may be supported at a convenient height by legs 22 having adjustable feet 24 to enable leveling of the container. Container 12 may be formed of stainless steel, for example, and may have a rounded lip 26 at the upper edges of its front and side walls. A skirt 28, which may also be of stainless steel, may be disposed below container 12 along its front and side walls, as shown, for aesthetic reasons. If desired, the container may have a removable or fixed work table (not illustrated) attached to one side thereof.

A closeable drain opening 30 may be centrally disposed within the bottom 32 of container 12, and connected via a conventional U-shaped trap 34 to a drain line 36, which in turn may be connected to a municipal drainage system or the like (not illustrated). A shallow, elongated open top trough 40 which extends the width of container 12 between side walls 16 and 18 may be disposed within the container on rear wall 20 with the top of the trough adjacent to but somewhat below the top edge 26 of the side walls, as shown. The trough may have a centrally located drain opening 42 which extends through rear wall 20 of the container and which is connected via a drain line 44 to a conventional tee connection 46 disposed between drain opening 30 and trap 34 of the container.

Rear wall 20 preferably extends above the upper edge 26 of the container, as shown, and may form one wall of a substantially rectangular upright enclosure 50 at the rear of the container. The enclosure may house various hydraulic and electrical components of the apparatus which will be described in more detail shortly. The upper portion of the rear wall above top edges 26 of the container may serve as a control panel for supporting various operating controls of the apparatus, such as an illuminated push button on-off switch 52 and a timer 54, the purposes of which will also be described in more detail shortly. Disposed in the rear wall is a plurality of water inlets and outlets, including a main water inlet 60 disposed below trough 40 for filling container 12 with water, a pair of spaced secondary water inlets 62 adjacent to the bottom 32 of the container for providing a secondary fresh cold water flow into the container, an outlet 64 centrally disposed between inlets 62 for removing water from the container, and a pair of spaced water inlets 66 angled upwardly toward the front wall 14 of the container (at 45°, for example) for introducing a recirculating water flow into the container. In addition, a water outlet 68 may be disposed in the rear wall and connected to a water level sensing mechanism (to be described shortly) for monitoring the water level in the container.

As will be described in more detail shortly, thawing apparatus 10 operates completely automatically. Upon initation of a thawing operation, it fills itself via main water inlet 60 with cold water to a predetermined level below the top of trough 40. The main water flow is then shut off, and a secondary flow of fresh cold water is supplied via inlets 62 continuously and at a controlled rate for the duration of the thawing operation. Simultaneously with the secondary water flow, water is withdrawn from the container via outlet 64 and pumped back into the container via angled inlets 66 to provide a recirculated water flow. The manner in which this is accomplished will now be described.

Figure 2:
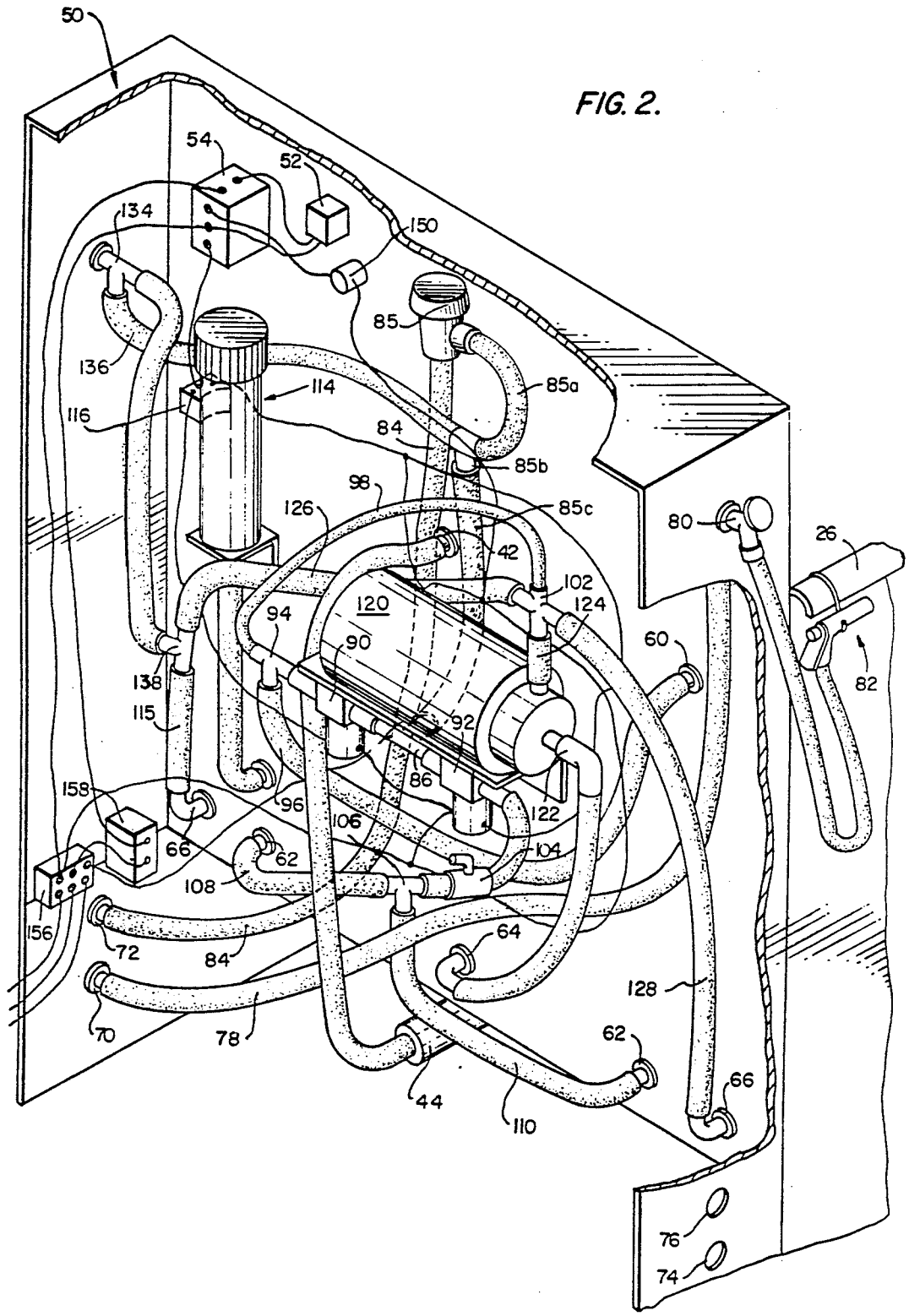
FIG. 2 is a rear perspective view of part of the apparatus of FIG. 1.
Figure 3:
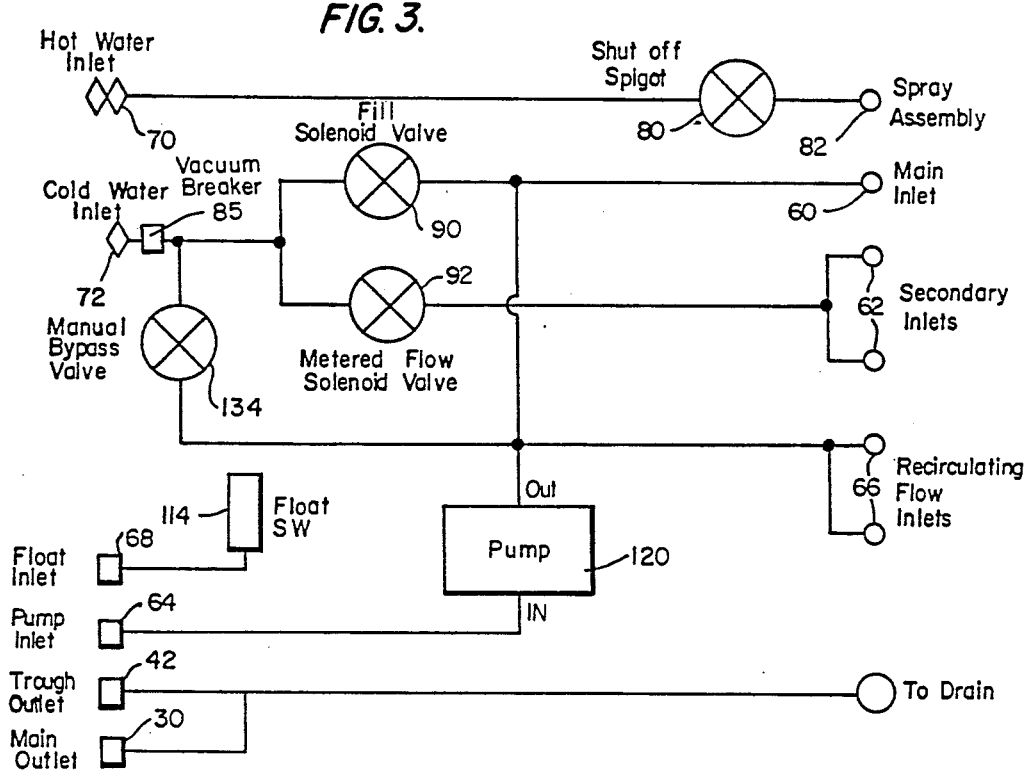
FIG. 3 is a hydraulic schematic of the apparatus of FIGS. 1 and 2.
Figure 4:
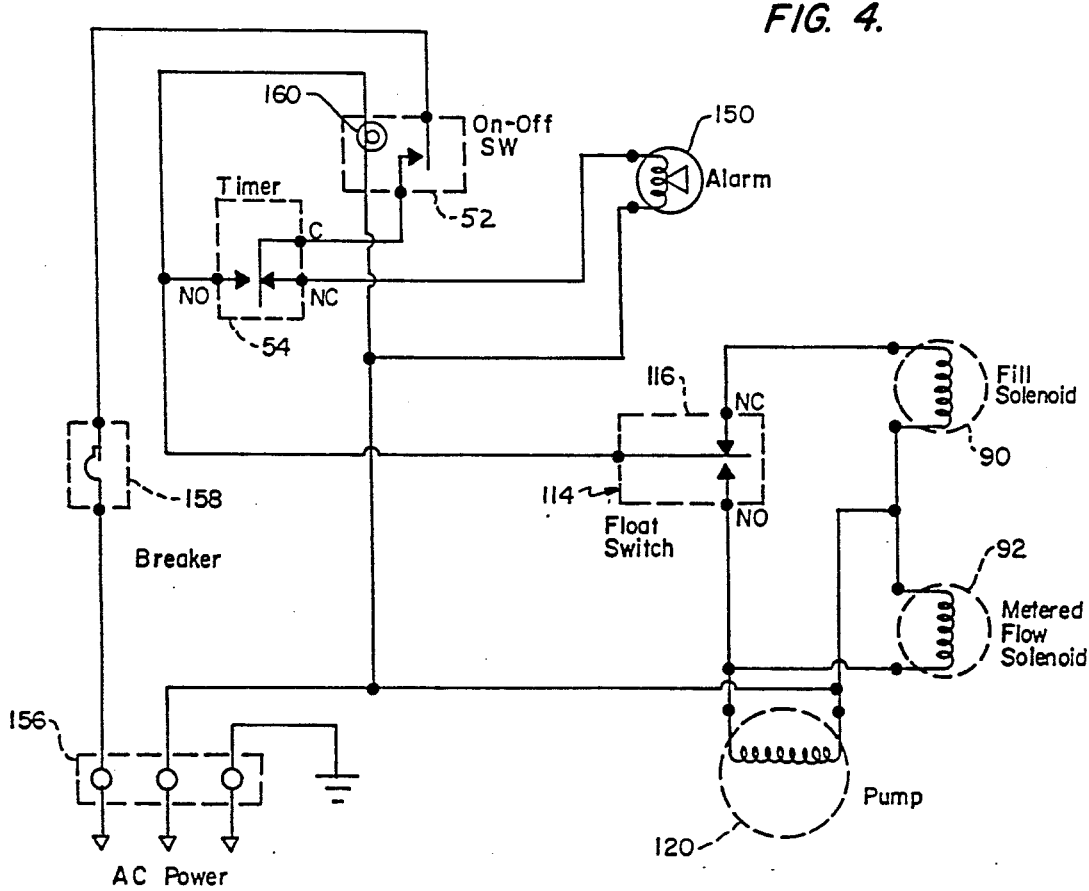
FIG. 4 is an electrical schematic of the apparatus.

FIG. 2 illustrates the arrangement of the hydraulic and electrical components of the apparatus housed within enclosure 50, and FIGS. 3 and 4 respectively illustrate schematically the hydraulic and electrical circuits of the apparatus. As shown in FIG. 2, hot and cold water enters the apparatus via hot and cold water inlets 70 and 72, respectively, disposed in one side wall of enclosure 50 (the left side wall in FIG. 2). To facilitate installation of the apparatus for different locations of the hot and cold water lines, holes 74 and 76 may be located in the opposite side wall of the apparatus to enable relocation of the hot and cold water inlets. The hot water inlet 70 is connected via a line 78 and a shutoff spigot 80 to a water spray assembly 82 to enable cleaning of the container. Hot water is not employed for thawing purposes, but only for cleaning purposes. The cold water inlet 72 is connected via a line 84 to a vacuum breaker device 85. The vacuum breaker is designed to prevent back-siphonage of water. Any conventional such device may be employed such as that designated by Watts, Inc. as Anti-siphon Vacuum Breaker No. 288A. While not depicted in the figure the device operates as follows. When the water supply valve ahead of the breaker is closed, or when it is open and a negative pressure is created in the supply line, a disc float within the device drops thereby opening an atmospheric vent while closing the orifice opening. This effectively prevents the creation of a vacuum in the discharge line from the breaker and prevents back-siphonage. As water flows through the breaker it lifts the disc float and closes the atmospheric vent against water leakage. It is to be understood that the vacuum breaker is optional in the system and may be eliminated entirely without effecting the ability of the apparatus to achieve the objects of the invention.

Line 85a connects the vacuum breaker 85 to tee-fitting 85b which splits the incoming cold water between line 85c and a manual by-pass system described in detail below. Line 85c carries the incoming cold water to a tee fitting 86 which further splits the incoming cold water to first and second electrically operated normally closed solenoid valves 90 and 92, respectively. Solenoid valve 90 is a water fill solenoid valve for filling the container with water, and its outlet is connected via a tee fitting 94 and a line 96 to the main water inlet 60 of the container. A second small diameter line 98 extends from tee fitting 94 to a cross fitting 102 to enable positive priming of a recirculating water pump 120, as will be described shortly. Upon being actuated, fill solenoid valve 90 enables the container to be filled with cold water.

Solenoid valve 92 serves as a control valve for a metered secondary fresh water flow into the container. Its outlet is connected to an inline adjustable meter valve 104, and via a tee fitting 106 and lines 108 and 110, to the secondary water inlets 62 of the container. Meter valve 104 is adjusted to afford a preselected secondary fresh water flow into the container.

Solenoid valves 90 and 92 are controlled (in the manner indicated in FIG. 4) by a float switch 114 which is connected to water outlet 68 of the container by a line 115. Float switch 114 may comprise, for example, one or more lightweight hollow balls, such as ping-pong balls, disposed within a cylindrical housing. As the water level in the container rises to a predetermined level, the water enters the float switch via line 115 and may cause the balls to move a lever which actuates an electrical switch 116 to switch power from the fill solenoid 90 to the metered flow solenoid 92. The predetermined level at which this occurs is dependent, of course, on the level at which the float switch is mounted with respect to the container. In addition to controlling the solenoid valves, the float switch also turns on pump 120, which provides a recirculating water flow in the container.

As shown in FIGS. 2 and 3, pump 120 has an inlet 122 connected to the centrally located pump inlet 64 of the container, and has an outlet 124 connected via cross fitting 102 and lines 126 and 128 to the angled water inlets 66 of the container. The pump draws water from outlet 64 of the container and recirculates the water back into the container principally via the angled inlets 66. Some water will also be recirculated into the container via main water inlet 60, the priming line 98, the connection 94, and line 96. However, since the inner diameter of priming line 98 is smaller than that of lines 126 and 128 (⅛ inch as compared to ⅜ inch, for example) most of the recirculated water will enter the container via the angled inlets 66.

The apparatus may also include a manual bypass (shut off) valve 134 connected via a line 136 to the tee fitting 85b of the apparatus, the outlet of the valve being connected via a tee 138 to line 126 at the pump outlet. The manual bypass valve enables manual filling and operation of the apparatus. The various water lines shown in FIG. 2 may be standard copper or flexible lines.

In operation, frozen food to be thawed may be disposed within a basket 140 (see FIG. 1) as of wire or perforated stainless steel, for example, which is formed to afford the free passage of water therethrough. The basket may be supported within container 12 as by forming it with lips 142 and 144 which respectively hook over the top edge 26 of the container and the top of trough 40. The basket may be sized to enable a plurality of baskets to fit within the container simultaneously. Timer 54 is then set for a preselected thawing time, and start switch 52 is actuated to initiate a thawing cycle. Initially, the container is empty. Upon actuation of the start switch, it fills with water to a level below the top of the trough. The main water flow is then shut off and the secondary fresh water flow and recirculating water flow are started and maintained for the duration of the preset time set by the timer. This is accomplished automatically as follows.

Referring to FIG. 4, timer 54 includes a relay portion having a movable contact C which is switchable between normally open (NO) and normally closed (NC) contacts. Upon actuation of the timer switch, the movable contact C, which is connected via switch 52 to the AC power, is switched to the normally open terminal of the relay portion. This applies power via the float switch 116 to the fill solenoid valve 90 which opens to enable filling of the container with cold water. When the water level in the container rises to a predetermined level just below the top of the trough 40, the float switch is actuated and its movable contact C switches to the normally open (NO) position. This removes power from the fill solenoid valve 90, and applies power to the metered flow solenoid valve 92 and to the pump motor. This closes the fill solenoid valve and opens the metered flow solenoid valve to initiate a metered secondary flow of fresh cold water into the container via water inlets 62 at a predetermined rate set by meter valve 104. At the same time, the pump is started to withdraw water from the container (via pump inlet 64) and the withdrawn water is recirculated back into the container via the angled water inlets 66.

As noted earlier, water inlets 66 are angled, preferably at an angle of the order of 45°, toward the front wall 14 of the container. This affords good mixing of the recirculated water with the water in the container and ensures a substantially even temperature distribution of the water. At the same time, the flow rate of the pump is selected to provide sufficient agitation of the water to break loose small food particles or debris from the frozen food and cause them to float to the surface. The metered secondary flow of water into the container from water inlets 62 causes the water level in the container to slowly rise and flow into trough 40. As the water flows into the trough, it carries with it the small food particles broken loose from the food as well as any food-related oils and debris which have floated to the surface, thereby producing a skimming action on the surface of the water. The water flowing into the trough is drained away via drain 42 and drain line 44.

Fresh water is supplied at the metered rate and the water in the container is simultaneously recirculated for the preselected period of time set by the timer 54. At the conclusion of this time period, the movable contact C of the timer switches to the normally closed (NC) position. This removes power from the pump motor and from the solenoid valves, and may cause power to be applied to an audible alarm 150 (see FIGS. 2 and 4) to signal completion of operation.

As further indicated in FIGS. 2 and 4, AC power may be supplied to the apparatus via a terminal strip 156 and a circuit breaker 158 (see also FIG. 2), and switch 52 may incorporate a pilot light 160 which is wired such that the light is illuminated when the movable contact C of the timer is in the normally open (NO) position.

The invention is capable of thawing large quantities of frozen food in substantially less time and with substantially less wasted water than required by known thawing methods, and produces a thawed food product which is superior in quality. In a preferred form, container 12 of the apparatus may comprise a large conventional stainless steel basin which is thirty inches wide, twenty-four inches deep and eighteen inches high, for example. Fresh water may be supplied to the container from meter valve 104 at a rate of the order of ¼–3 gal./min., with a rate lf ½ gal./min. being preferred. Recirculation pump 120 may have a capacity of the order of 12–16 gal./min., with a capacity of 14.5 gal./min. being preferred. Such flow rates and capacities are sufficient to provide good agitation of the water within the container, ensure an even temperature distribution, and are sufficient to break loose small food particles from the food being thawed.

The fresh water supplied continuously to the container at the metered rate (½ gal./min.) has several advantages. First, this affords a smooth continuous water flow into the trough and a continuous skimming operation to remove small food particles, food-related oils, and debris from the water in the container. Second, it is desirable to maintain the temperature of the food being thawed at 70° F. or less to inhibit the growth of bacteria. In a typical municipal water system, the temperature of the cold water is of the order of 68° F. By providing a continuous fresh water supply to the container, and by recirculating the water within the container using the pump, a substantially even water temperature of the order of 60° F., for example, may be maintained throughout the container to ensure even thawing of the frozen food while inhibiting the growth of bacteria.

Apparatus in accordance with the invention having the previously given dimensions and flow rates is capable of completely thawing approximately 130 pounds of frozen food in about an hour to an hour and fifteen minutes. In contrast, it would require approximately three-four hours, and substantially more wasted water, to thaw the same quantity of food in a conventional manner by running water at a rate of the order of five-eight gal./min. into the top of a basin having a stand pipe drain. Furthermore, the invention affords a better quality thawed product since the food is not immersed in water for as long a period of time, and there is less tendency for the food to become waterlogged and its taste to be washed out.

The completely automatic functioning of apparatus in accordance with the invention is also an advantage since it may be operated unattended and a precise thawing time may be set using the timer. Accordingly, it affords more efficient thawing. If desired, the apparatus may be configured to automatically drain water from the container at the conclusion of a thawing operation by employing another electrically operated solenoid valve in the drain line from main drain 30 of the container, and by opening the valve at the end of a thawing cycle to drain water from the container. In addition, the apparatus may be configured with a conventional hot and cold water faucet 166 (as illustrated in phantom lines in FIG. 1), in which case the manual bypass 134 may be eliminated, if desired.

While a preferred embodiment of the invention has been shown and described, it will be appreciated by those skilled in the art that changes may be made in this embodiment without departing from the principles and spirit of the invention, the scope of which is defined in the appended claims.

I claim:

1. Apparatus for thawing frozen foods, comprising:
a container having a top and a bottom;
a drain disposed adjacent to the top of said container;
first means for filling said container with fresh water to a predetermined level;
second means, operative upon filling said container to said predetermined level, for supplying a flow of fresh water into said container at a predetermined first flow rate such that water in said container rises above said predetermined level and enters into said drain, whereby water is removed from said apparatus; and
third means, operative concurrently with the second means, for removing water from said container and recirculating it back into the container at a predetermined second flow rate which is higher than said first flow rate, such that circulation of water in said container is sufficient (i) to maintain a substantially even water temperature throughout said container and (ii) to dislodge food particles from frozen foods immersed in said container.

2. The apparatus as recited in claim 1, further comprising electrical control means for automatically controlling said first, second and third means.

3. The apparatus as recited in claim 2, wherein said electrical control means comprises a timer for setting a preselected thawing time, said second means and said third means being operative only during said preselected thawing time.

4. The apparatus as recited in claim 2, wherein said first means comprises an electrically controlled valve, and said electrical control means includes means for detecting when water in said container rises to said predetermined level and means for closing said valve when water in said container rises to said predetermined level.

5. The apparatus as recited in claim 4, wherein said detecting means comprises a float switch.

6. The apparatus as recited in claim 2, wherein said second means comprises a plurality of water inlets adjacent to the bottom of said container, and electrically controlled valve means for providing water to said inlets at said first flow rate.

7. The apparatus as recited in claim 6, further comprising a trough disposed in said container and wherein said electrically controlled valve means comprises an electrically controlled valve and an adjustable meter valve and wherein said meter valve is adjusted to supply a flow of fresh water into said container at said predetermined first flow rate such that water in said container flows into said trough providing a skimming action such that food particles are removed from water in said container.

8. The apparatus as recited in claim 7, wherein said first flow rate is in the range of ¼ to 3 gallons per minute, and water in said container has a temperature $\leq 70°$ F.

9. The apparatus as recited in claim 7, further comprising a basket disposed in said container and supported by said trough and the top of said container, said basket formed to allow water in said container to flow therethrough.

10. The apparatus as recited in claim 2, wherein said container has a water outlet and a plurality of water inlets disposed adjacent to the bottom of said container and said third means comprises a pump having an inlet connected to said water outlet and an outlet connected to said water inlets, and wherein said water inlets are formed such that removed water from said container passes therethrough and is pumped toward the top of said container.

11. The apparatus as recited in claim 10, wherein said pump has a capacity of about 12 to 16 gallons per minute.

12. The apparatus as recited in claim 1, wherein said first means is done manually.

* * * * *